(12) United States Patent
Ieda

(10) Patent No.: US 7,070,116 B2
(45) Date of Patent: Jul. 4, 2006

(54) CONSTRUCTIVE ARRANGEMENT APPLIED TO AN INTEGRATED THERMOSTATIC VALVE DEVICE

(75) Inventor: João José Cardinali Ieda, Vila Independencia (BR)

(73) Assignee: Wahler Metalurgica Ltda (BR)

( * ) Notice: Subject to any disclaimer, the term of this patent is extended or adjusted under 35 U.S.C. 154(b) by 0 days.

(21) Appl. No.: 10/600,086

(22) Filed: Jun. 20, 2003

(65) Prior Publication Data

US 2004/0004132 A1    Jan. 8, 2004

(30) Foreign Application Priority Data

Jun. 21, 2002    (BR)    ................................ 8201525 U

(51) Int. Cl.
*F01P 7/16*    (2006.01)
(52) U.S. Cl. .................................................... 236/34.5
(58) Field of Classification Search ................... 236/34, 236/34.5
See application file for complete search history.

(56) References Cited

U.S. PATENT DOCUMENTS

| | | | | |
|---|---|---|---|---|
| 4,269,350 A | * | 5/1981 | Beck | 236/34.5 |
| 4,524,907 A | * | 6/1985 | Wong | 236/34.5 |
| 4,883,225 A | * | 11/1989 | Kitchens | 236/34.5 |
| 5,083,705 A | * | 1/1992 | Kuze | 236/34.5 |
| 5,755,283 A | * | 5/1998 | Yates et al. | 165/297 |
| 5,979,778 A | * | 11/1999 | Saur | 236/34.5 |
| 6,471,133 B1 | * | 10/2002 | O'Flynn et al. | 236/34.5 |
| 6,520,418 B1 | * | 2/2003 | Kunze et al. | 236/34.5 |

* cited by examiner

*Primary Examiner*—William E. Tapolcai
(74) *Attorney, Agent, or Firm*—William J. Sapone; Coleman Sudol Sapone P.C.

(57) ABSTRACT

A constructive arrangement applied to an integrated thermostatic valve device has a tubular hollowed-out body (1), which allows it to have a chamber (2) and a flange (3) with holes (4) for screws for fixing to the engine housing and having a central opening (5), which determines the mouth of the chamber, alongside which there is a ring-shaped groove (6) for housing a sealing ring (7). An internal projection in the shape of an inverted "Y" (1) has a leg which is cross-shaped (11) and which extends to the level of the mouth of the body, and having on the point of the intersection of the converging part of the "Y" a fixing hole (12) for centralizing the thermostatic valve when it is being assembled. An upside down plate (3) is fixed to the end of the leg of the "Y", between which and the converging parts of the "Y" there is a pressure spring. A pressed metal disc (17) supports the working element (16) of the thermostatic valve, with a central hole through with the terminal (18) moves. A washer (19) is fixed to the end of the temperature sensor for supporting a circular sheet (20) with a central hole through which the terminal of the aforementioned working element passes when it is functioning, and between this sheet (20) and a step formed in the body of the working element there is a conical pressure spring (21).

1 Claim, 3 Drawing Sheets

CONSTRUCTIVE ARRANGEMENT APPLIED TO AN INTEGRATED THERMOSTATIC VALVE DEVICE

TECHNICAL FIELD OF THE INVENTION

This invention deals with a constructive arrangement as applied to an integrated thermostatic valve device, with an innovative conception and providing significant technological and functional improvements, in accordance with the most modern concepts of automotive engineering and in accordance with the required norms and specifications, which give it its own characteristics and the fundamental requisite of novelty, thereby resulting in a series of real and extraordinary technical, practical and economic advantages.

BACKGROUND

Previously thermostatic valves were attached to the housing which was after fixed to the engine, and only then did they receive the lid coupling, such procedures resulting in more labor, loss of time and an increase in operational and production costs. This way of assembling the thermostat made for a more complex assembly process, and an increase, not only in time and labor, but also in manufacturing costs. It demanded special attention so that the necessary precision relative to the assembly of the thermostat on the housing was achieved, although on many occasions this was not achieved and consequently this had a negative influence on the functioning of the device, which left a lot to be desired as far as the quality of the final product and the guarantee that it would work well were concerned, because it prevented the water, which could be either interrupted or diverted, from flowing freely, this causing considerable and obvious losses.

Attempts were made to eliminate these problems and inconveniences by means of subsequent studies and as a result a technique was developed which allowed for the concept of a new constructive design for the thermostat to be developed, from which came the possibility of combining the thermostatic valve with the housing itself, thereby achieving an integrated product with real possibilities for achieving manufacturing economies, by minimizing costs, assembly time and labor expenses, as well as having a precise effect on the assembly process, with better results and a high level of safety.

From the way this integrated device was conceived, it was possible to drastically reduce its dimensions and consequently the amount of material used, thereby improving the cost/benefit relationship in relation to the value needed to increase the assembly, allowing for maximum facilitation when it came to attaching it to the engine.

This design with its drastic reduction in material allowed parts to be designed (housing and lid) with the appropriate shape and ideal placement to meet all the operational and installation needs. The re-dimensioning of these parts to fit conventional housings allowed interfaces with all other connecting parts, such as hoses and the engine, to be respected, thereby taking advantage of the spaces of the other attachment components.

The integrated device also offered real possibilities for economies in manufacturing and a significant reduction in labor costs, because it provided a very accurate way of assembling the thermostatic valve, in such a way as to get the best results, the best operating conditions of the engine, the best finish on the final product and competent engineering.

SUMMARY OF THE INVENTION

In general terms, the thermostatic valve is made up of a working element or temperature sensor, a bridge that supports the whole device, a helical spring that is located between the supporting bridge and a side rim attached to the aforementioned temperature sensor, which determines the amount of obstruction and controls the flow of cooling liquid, and a pin for centralizing the assembly, located on the upper surface of the working element or temperature sensor.

In order to achieve the integration of the thermostatic valve with the housing, the latter was provided with two legs fitted at right angles, on the facing surfaces of which there is a recess into which the ends of the supporting bridge are slotted in such a way as to lock, the centralization of the thermostatic valve being achieved by placing the centralizing pin in a small slot in an internal projection of the housing, thereby fixing the whole of the thermostat device and joining it to the housing as a whole.

The innovation has to do with a new construction of the integrated thermostatic valve, with a significant technological and functional improvements, more particularly with regard to the attaching procedure, which is done differently from the way described for the integrated devices mentioned above and which have been the object of various patents both requested by and granted to the present petitioner. With this particular innovation the two legs at right angles are removed from the housing where the supporting bridge and the whole of the thermostatic valve device are attached. Which in addition to other technical, practical and functional advantages, as well as giving the product more robustness, which is ideal for achieving its operation and installation needs, improves the cost/benefit factor and provides economical solutions (construction simplicity—single device), greater physical free space, simple maintenance and thermodynamics.

BRIEF DESCRIPTION OF THE DRAWINGS

To obtain a clearer picture of the new construction technique used in the integrated thermostatic valve device in question designs are attached, to which reference is made in order to better illustrate the following detailed description.

DETAILED DESCRIPTION OF THE INVENTION

Figure 1:
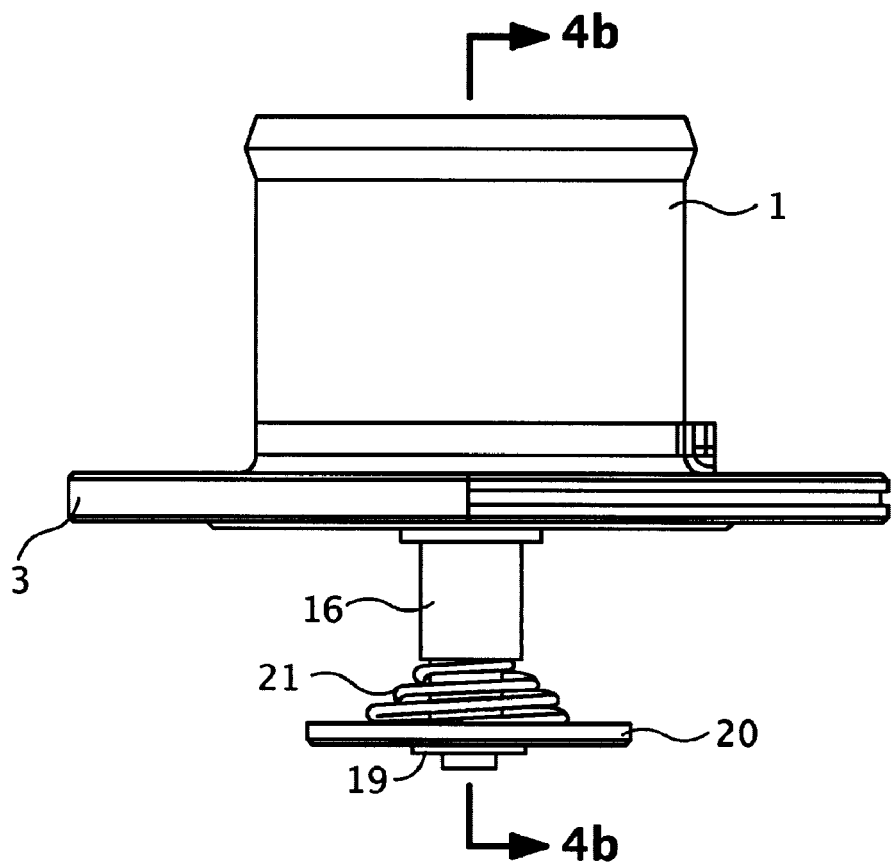
FIG. 1: Shows a side view of the integrated thermostatic device with its new constructive design.
Figure 2:
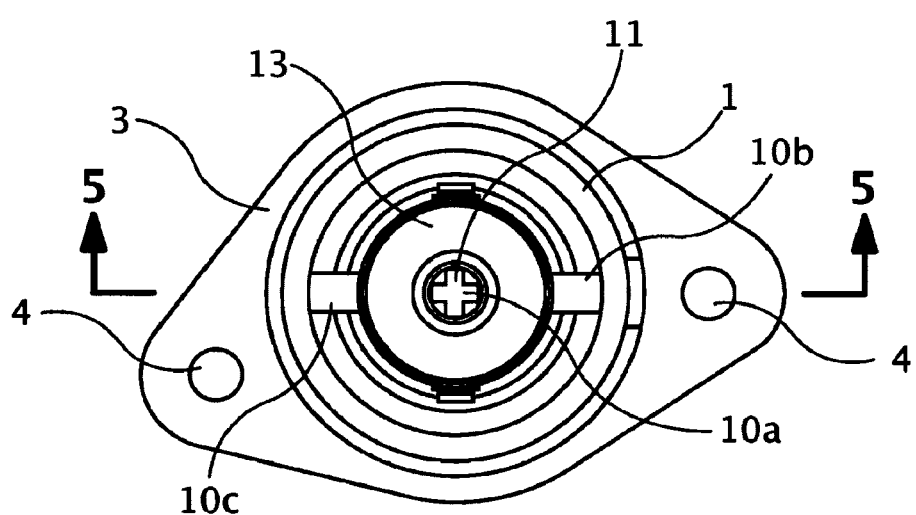
FIG. 2: Shows the view from above.
Figure 3:
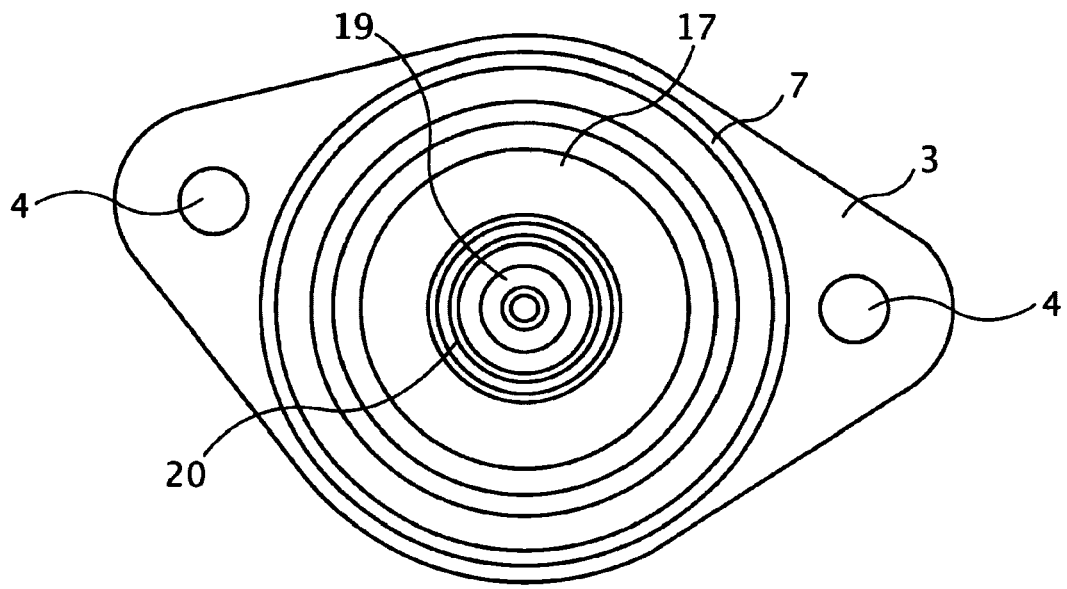
FIG. 3: Shows the view from below.
Figure 4A:
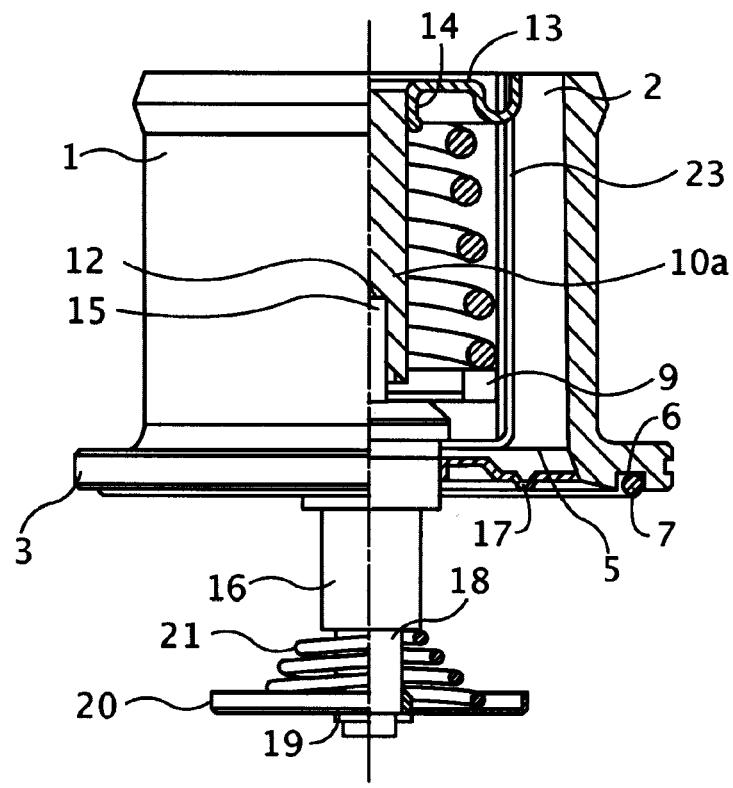
FIG. 4a shows the lengthwise (partial) sectional view, along a plane indicated by the A—A line in FIG. 1.
Figure 4B:
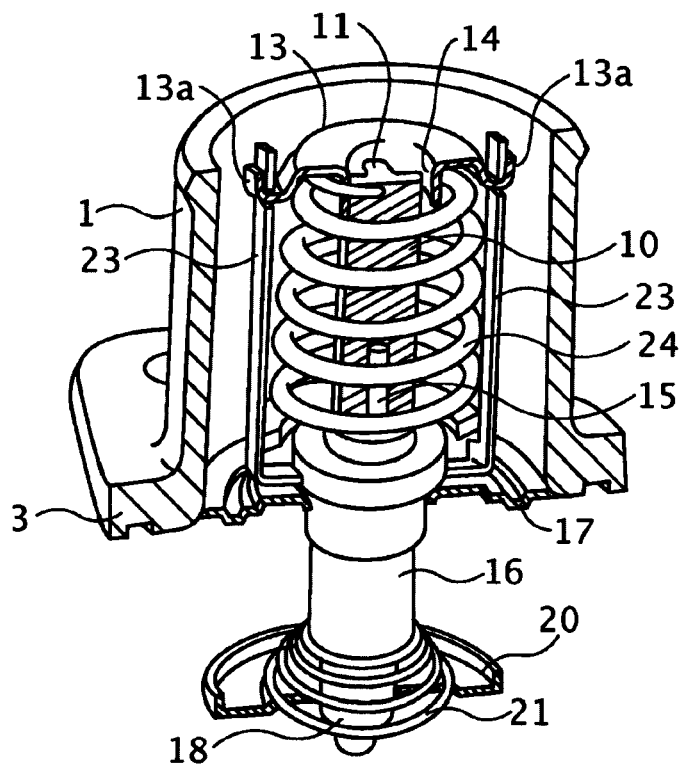
FIG. 4b shows the lengthwise (full) sectional view thereof.
Figure 5:
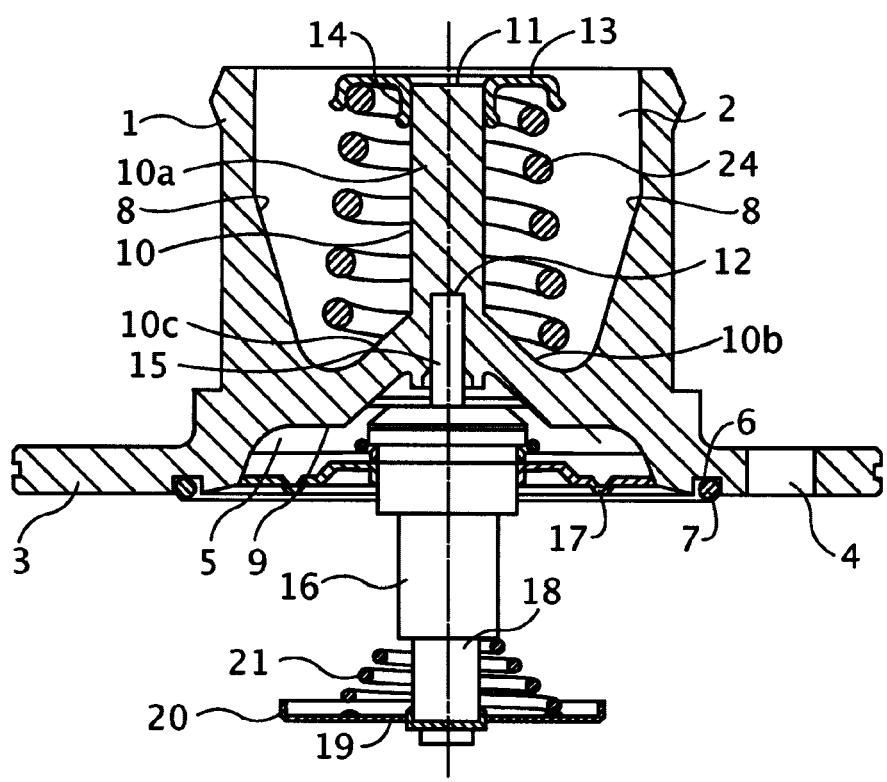
FIG. 5: Shows a crosswise sectional view, along a plane indicated by the B—B line in FIG. 2.

In accordance with these illustrations and their details, the Constructive Design applied to the Integrated Thermostatic Valve Device here set out is essentially characterized by showing a hollowed out body in tubular form (1) which allows for a chamber (2) to facilitate the flow of cooling liquid, the same projecting from a flange (3) which has holes (4) for taking the screws for fixing it to the engine housing and having a central opening (5) that determines the mouth of the chamber, alongside which there is a ring-shaped groove (6) for receiving the sealing ring (7).

Within the hollowed out body (1), more precisely in the chamber (2) built into it, two longitudinal conical projections (8) are molded along the length of the two diametrically opposed sides and between them, near the opening, they form the shape of a ring (9), from which protrudes an inverted "Y" shaped extension (10), the cross-shaped (11) leg of which extends to the level of the opening in the body and having at the point where the converging parts (of the "Y") intersect an opening (12) for use in centralizing the thermostatic valve when it is being assembled.

At the end of upright leg (10a) of the inverted "Y" extension, a part in the shape of an upside-down plate (13) is located which is permanently fixed to the working element 16, by vertical blades (23). This part has a central ring shaped projection (14), which is used for engagement to the leg (10a) and being slidable thereover. Between the plate (13) and the converging legs 10b and 10c of the "Y", there is a pressure spring.

The thermostatic valve which is not an element of the characterization of this Utility Model patent, but which is shown here merely as an example of how it is used and assembled, is attached to the lower part of the housing, with its centralization pin (15) placed in the fixing hole (12), and is held by the working element or temperature sensor (16), which is supported on a disc in stamped metal sheet (17) with a central hole with a rim, through which the terminal (18) of the aforementioned working element (16) moves, the peripheral edge of the disc (17) being fixed into the internal surround of the chamber opening.

On one end of the temperature sensor a washer (19) is fixed, which supports a circular meta 1 sheet (2) with a turned edge and central hole, through which the terminal of the aforementioned working element passes when it is functioning. Between this circular metal sheet (2) and aa small step formed in the body of the working element, because of a difference in the diameters between the body and the terminal, there is a conical pressure spring (21).

The thermostatic valve operates in conventional fashion. The pressure spring 25 pushes the plate 13 upwardly to keep the working element 16, attached to the plate 13 by vertical blades 23, in the closed position, when an engine is cold. When the engine reaches its working temperature, die working element overcomes the pressure spring bias, moving downwardly both the plate 13 and projection 14 which slide down over the leg 10a, allowing fluid to flow through the thermostatic valve device.

Thus formed, the thermostatic valve device with its new constructive design fully satisfies the objectives proposed and fulfills in a practical and efficient matter those functions for which it was designed, providing a series of technical, practical, functional and economic advantages that give the product its own characteristics, which are innovative, and having the fundamental requisite of being entirely new.

While preferred embodiments of the present invention have been shown and described, it will be understood that various changes or modifications may be made without varying from the present invention.

The invention claimed is:

1. An integrated thermostatic valve device comprising a hollowed-out, tubular-shaped body (1), which has a chamber (2) which extends from a flange (3) having holes (4) for screws that fix the body to an engine housing, the flange having a central opening (5) that defines a mouth of a chamber, an edge of the mouth provided with a ring-shaped groove (6) for housing a sealing ring (7); the hollowed-out, tubular shaped body (1) having a circumferential ring (9) from which projects a pair of legs (10b, 10c) leading to an upright leg (10a), forming an inverted "Y"(10), the upright leg having a first end at a level of an opening in the body and having a fixing hole (12) on a second end thereof at an intersection of the pair of legs of the inverted "Y", an upside down plate (13), disposed about the first end of the upright leg, having a ring-shaped central projection (14) slidable over the upright leg, a pressure spring located between the plate (13) and the pair of legs of the inverted "Y", a metal sheet disc (17) being engaged to an internal lip of a chamber opening for supporting a working element or temperature sensor (16) of the thermostatic valve, the working element or temperature sensor having a central hole in which a terminal (18) of the working element or temperature sensor (16) moves; a pair of vertical blades (23) connected between the plate (13) and the working element or temperature sensor (16); a washer (19) fixed to an end of the working element or temperature sensor (16) for supporting a circular sheet (20) having a turned edge and having a central hole through which the terminal of the working element or temperature sensor is movable in response to temperature changes, a conical pressure spring located between the circular sheet (20) and a step formed in a body of the working element or temperature sensor.

* * * * *